UNITED STATES PATENT OFFICE.

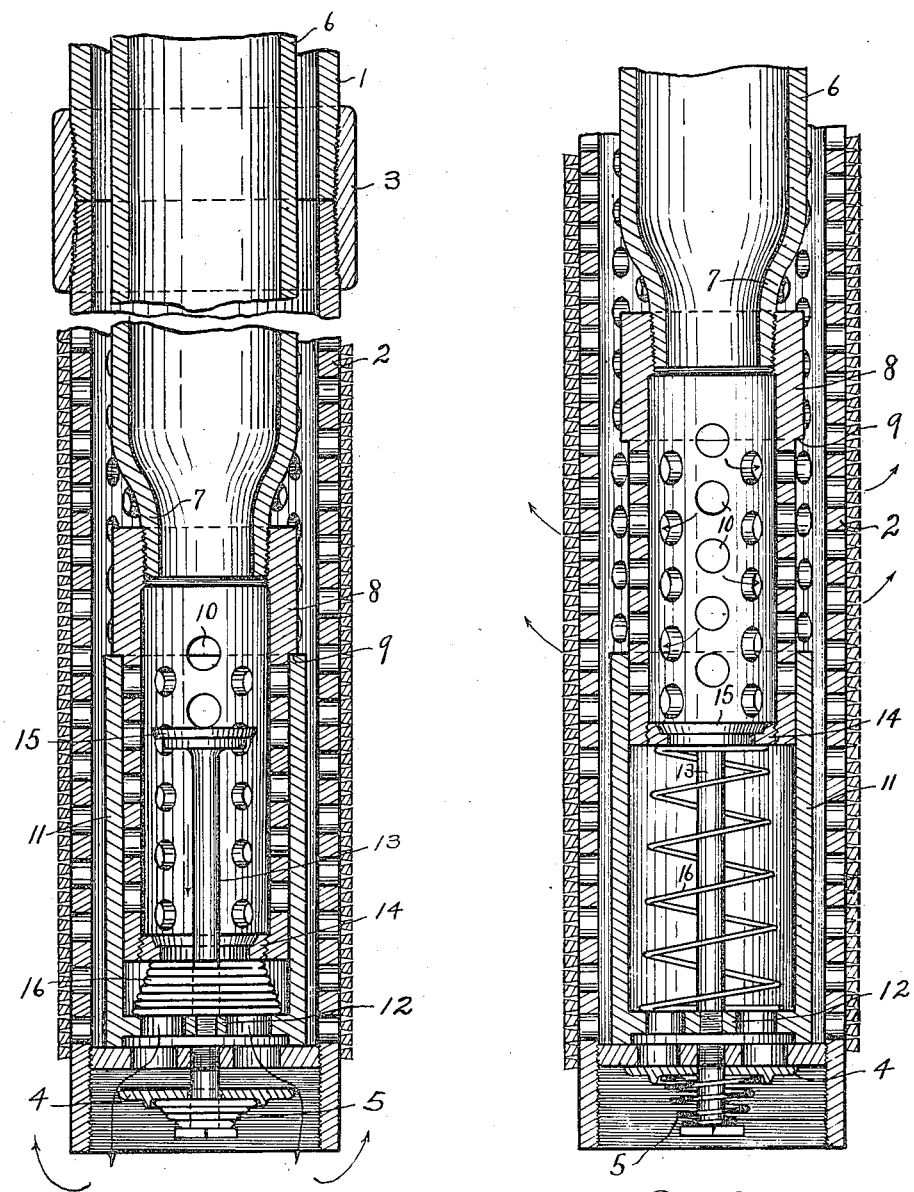

JAMES O. MACK, OF HOUSTON, TEXAS.

WASHER FOR WELL-SCREENS.

1,305,914.  Specification of Letters Patent.  Patented June 3, 1919.

Application filed January 24, 1919. Serial No. 272,952.

*To all whom it may concern:*

Be it known that I, JAMES O. MACK, a citizen of the United States, residing at Houston, in the county of Harris and State of Texas, have invented certain new and useful Improvements in Washers for Well-Screens, of which the following is a specification.

This invention relates to new and useful improvements in a washer for well screens.

The object of the invention is to provide a device of the character described, whereby a screen or strainer set in a well may be washed and cleansed. In the production of petroleum and other similar minerals, a well screen is usually set in the bore opposite the oil bearing strata, and the oil flows in through the screen, and is forced by fluid pressure, or by a pump, up to the surface through the pipe to the lower end of which the screen is attached. This screen may be of any well known form, but usually consists of a perforated pipe, wrapped with screen wire, the turns of the screen wire being spaced apart, providing slits to permit the inflow of the fluid. Sometimes these slits become clogged up by fine sand, or other detritus so as to partially or completely shut off the inflow of fluid. It is the object of this invention to provide a device whereby a screen may be washed and the deposits dislodged from said slits, so as to permit the free inflow of the oil.

Another object of the invention is to provide a device of the character described, whereby the water may be discharged through the lower end of the screen, and then return around the outer side of the screen so as to wash the outside thereof, and whereby the water may also be forced by pressure through the perforations and slits of the screen from the inside thereof, thereby dislodging all sand and detritus from the screen and thoroughly washing and cleansing the same.

A further feature of the invention resides in the provision of a device of the character described, which may be cheaply and easily constructed and readily applied to a well for the purposes indicated.

With the above and other objects in view, the invention has particular relation to certain novel features of construction, operation and arrangement of parts, an example of which is given in this specification and illustrated in the accompanying drawings, wherein:

Figure 1, is a vertical sectional view showing the device in position to wash and cleanse the lower end of the screen, and Fig. 2, is a longitudinal sectional view, showing the device in position to wash out the upper parts of the screen by forcing the water from within outwardly through the screen.

Referring now more particularly to the drawings, wherein like numerals of reference designate similar parts in each of the figures, the numeral 1 refers to a pipe, or casing, which is let down into the well bore, and to the lower end of which the well screen 2 is attached by means of the coupling 3. The screen shown is formed of a perforated pipe wrapped with screen wire. The lower end of the screen is normally closed by means of the back pressure valve 4, which is opened by the fluid pressure within the screen to permit the discharge of water therethrough, but which is normally held closed by means of the spring 5, to prevent the inflow of fluid into the screen. This screen is set in the oil bearing strata of the bore, and the oil flows in through the screen and thence passes up through the pipe 1, either by fluid pressure or through the influence of a pump, and is discharged through said pipe 1, at the surface of the ground. Should the screen become clogged up, it may be washed out and freed of all clogging material through the instrumentality of the washer, which will now be described. This washer includes a tubing 6, considerably smaller in diameter than the casing 1, and which is let down from the surface into said casing. The lower end of this tubing is reduced, as at 7, and has the tubular section 8 threaded onto the lower end thereof. The lower part of this section 8 is reduced forming the abrupt annular shoulder 9, and said reduced portion has the perforations 10. A blank section of pipe 11 is fitted closely over said perforated section and the lower end of this blank section 11 has the spider 12 secured therein. Attached to the spider and upstanding therefrom is the valve stem 13, which extends up through the central opening of the valve seat 14, which is fixed in the lower end of the tubular section 8, and the upper end of said stem carries the valve 15, which normally closes the opening in said seat. Interposed between the spider 12 and the seat 14, and surrounding the stem 13, is a spiral spring 16. When the device is suspended in the bore, the stem 13 will hold the blank section 11 suspended and will prevent it from dropping off but is of such a length as to prevent the disengagement of the upper end of said section from the lower end of the tubular section 8, when in this position. The washer is usually let down entirely to the bottom of the screen, and the weight of the tubing 6 will be sufficient to overcome the pressure of the spring 16 and will force the reduced perforated portion of the tubular section 8 down into the blank section 11, until the annular shoulder 9 rests against the upper end of said last mentioned section. This will operate to lift the valve 15 relative to its seat 14. Water is forced under pressure down through the tubing 6 and passes on down through the seat 14, and the spider 12, and out through the valve 4, and returns up around the outer side of the screen, thus washing said screen on the outside. The device is then gradually raised, the spring 16 forcing the blank section 11 downwardly relative to the perforated part of the tubular section 8, seating the valve 15 and clearing the perforations 10, and the water is then forced out through said perforations and on through the screen, and as the device is moved up and down, in the screen, the water is forced under pressure through the perforations and slits of the screen, freeing said screen from all detritus and clogging matter, and leaving it free to permit the free inflow of the oil through said screen.

What I claim is:

1. A washer for well screens, including a fluid conducting tube, adapted to be let down into a well, a perforated section carried by the lower end thereof, a tubular blank section adapted to fit over said perforated section, a valve seat having a central opening carried by the lower end of said perforated section, a spider carried by the lower end of said blank section, a valve stem whose lower end is secured to said spider and whose upper end projects through said opening, a valve carried by the upper end of said stem and adapted to close said opening, and a yieldable member interposed between said spider and seat.

2. A washer for well screens, including a fluid conducting tube, adapted to be let down into a well, a perforated tubular section carried by the lower end of said tube, a blank section adapted to fit over said perforated section and movable lengthwise relative thereto, a valve seat provided with an opening carried by said perforated section, a valve stem fixed relative to the blank section and projecting through said opening, and a valve carried by the upper end of said stem and adapted to open and close said opening.

3. The combination with a well screen, of a valve controlling the lower end thereof, a washer adapted to be let down into said screen, said washer including a fluid conducting tubing, a perforated tubular section carried by the lower end thereof, a blank tubular section adapted to fit over said perforated section, and movable lengthwise thereon, a valve seat fixed in the lower end of said tubular section and having an opening, a stem support in said blank section, a valve stem upstanding therefrom and projecting through said opening, a valve carried by the upper end of said stem and adapted to open and close said opening, said stem sustaining said blank section when the device is suspended, a yieldable member interposed between said stem support and valve seat, said perforated section being forced by gravity into the blank section when the latter is sustained from beneath, thereby closing the perforations of said section and lifting the said valve to permit the flow of water through the seats of said valve, and said yieldable member operating to cause said blank section to clear the perforations of said perforated section, and seat the valves carried by the said stem, when said device is suspended.

4. A washer for well screens, including a tubing, adapted to be let down into a well, a perforated tubular section carried by the lower end of said tubing, a valve controlling the lower end of said section, and means for closing said perforations and simultaneously opening said valve.

In testimony whereof I have signed my name to this specification in the presence of two subscribing witnesses.

JAMES O. MACK.

Witnesses:
E. V. HARDWAY,
WM. A. CATHEY.